March 3, 1959

J. L. BOWER ET AL 2,875,524

MAGNETIC GAUGE

Filed July 1, 1955

INVENTORS.
JOHN L. BOWER
BY WILTON R. ABBOTT

ATTORNEY

March 3, 1959   J. L. BOWER ET AL   2,875,524
MAGNETIC GAUGE

Filed July 1, 1955   3 Sheets-Sheet 2

*INVENTORS.*
JOHN L. BOWER
BY WILTON R. ABBOTT

William R. Lane
ATTORNEY

March 3, 1959 J. L. BOWER ET AL 2,875,524
MAGNETIC GAUGE
Filed July 1, 1955 3 Sheets-Sheet 3

INVENTORS.
JOHN L. BOWER
BY WILTON R. ABBOTT

*William R. Lane*
ATTORNEY

United States Patent Office 2,875,524
Patented Mar. 3, 1959

2,875,524

MAGNETIC GAUGE

John L. Bower, Downey, and Wilton R. Abbott, Whittier, Calif., assignors to North American Aviation, Inc.

Application July 1, 1955, Serial No. 519,602

6 Claims. (Cl. 33—125)

This invention relates to a magnetic gauge which provides precise measurements and indication of distances. This gauge makes maximum use of information provided by reluctance devices so as to indicate direction of displacement as well as magnitude.

Scientific apparatus often requires measurement of distances to an accuracy of one ten-thousandths of an inch. Precise control of automatic machine tools likewise requires reliable information as to distances of the same order of magnitude. It is proposed in the device of this invention to use digital information provided by reluctance sensitive devices which cooperate with the ferromagnetic characteristics of a gauge beam rather than use analog information which requires accurate voltage sources and precision electronic equipment. Information handled in digital form is superior to that in analog systems, ordinarily, in that each bit of indicated information is discrete in character and reliably distinguishable from other bits of information.

Various schemes of measurement in the past have provided only for indication of the accuracy of specific lengths, or have provided single heads and have extracted a minimum of information from a gauge. This device provides continual indication of length and provides for indication of direction measured.

Digital information is obtained by reason of the fact that signals are indicated by two easily distinguishable reluctance levels and does not require distinction between many values of reluctance.

This invention proposes taking advantage of the statistical average accuracy of many lines scribed by a device such as the ruling engine or lines which are etched according to scribed standards or are photographically reproduced. Many lines are utilized in each measurement of distance.

It further proposes using several heads to obtain an accuracy which is a fraction of the distance between scribed lines. This invention maintains simplicity despite the precision which it obtains.

It is therefore an object of this invention to provide a magnetic gauge.

It is a further object of this invention to provide a magnetic gauge which indicates direction and magnitude of displacement.

It is another object of this invention to provide a magnetic gauge having improved accuracy.

It is still another object of this invention to provide a magnetic gauge which cumulatively indicates distances traveled in either direction.

Another object of this invention is to provide a device capable of indicating relative rotation between two members.

It is another object of this invention to provide a magnetic gauge utilizing information in digital form.

It is still another object of this invention to provide a magnetic gauge requiring a minimum of precision in construction.

It is still another object of this invention to provide a magnetic gauge which is relatively insensitive to variations in power supply and characteristics of circuit elements.

Other objects of this invention will become apparent from the following description taken in connection with the accompanying drawings, in which Fig. 1 is a perspective view of the device;

Figure 1:
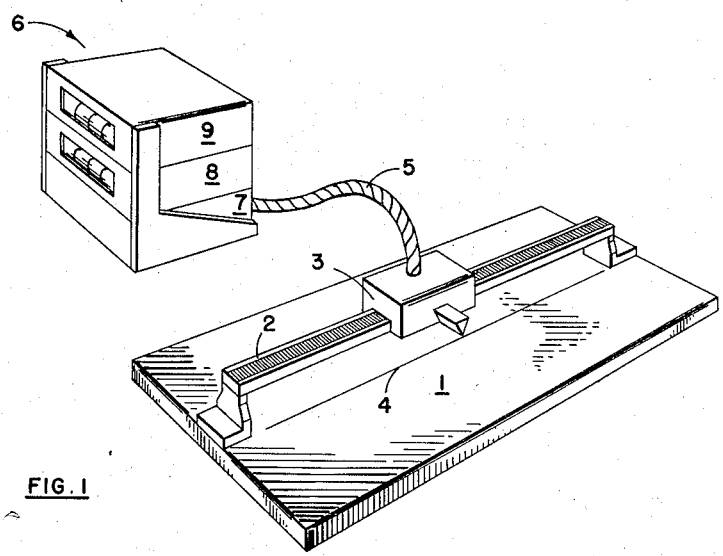

In Fig. 1 a table or workbench 1 has mounted thereon, a first element illustrated as a gauge beam 2 which is traversed by a second element illustrated as a reading head assembly 3, consisting of one or several reading heads. These reading heads are, essentially, inductors having cores whose pole faces are in proximate relationship with the gauge beam 2. Distances are measured along the direction of line 4 and electrical indication is provided through cable 5 to console 6 which is composed of various electronic equipment 7, a counter 8, which indicates the number of increments moved to the right, and a counter 9, which indicates the number of increments moved to the left. This output may be further combined in a single add-subtract counter to indicate net motion.

Figure 2:
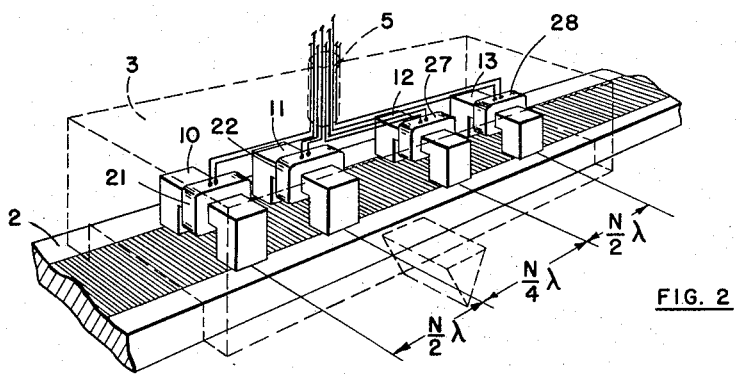
Fig. 2 is a sketch of the gauge beam and an internal view of the reading assembly of the device.

Fig. 2 illustrates the internal construction of head assembly 3 in its relative position to gauge beam 2. Within the head assembly 3 are, for example, four reading heads 10, 11, 12 and 13 which are held in upright position in close, spaced relationship with gauge beam 2. The electrical connections to the coil of each core converge to be combined in cable 5.

Figure 3:
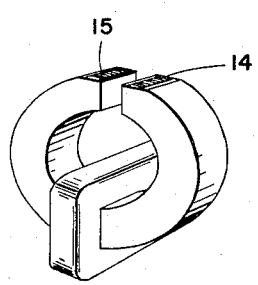
Fig. 3 is a perspective of the underside of one reading head.

Fig. 3 illustrates the face of one ferromagnetic core of C-type construction showing scribed lines made, for example, by a ruling engine on the two faces 14 and 15 of the core 10. The face of each pole, surrounding the scribed lines should be nonmagnetic.

Figure 4:
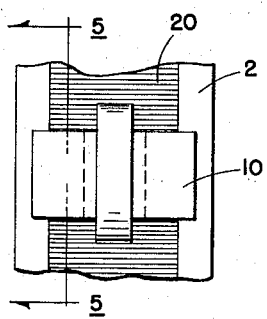
Fig. 4 is a top view of one reading head and the gauge beam.

Fig. 4 illustrates a top view of core 10 with head assembly case 3 removed and gauge beam 2. The illustrations thus far show the lines on both gauge beam 2 and the reading heads in enlarged form. It is to be understood that these lines are scribed, for example, one five-hundredths of an inch apart and even less.

Figure 5:
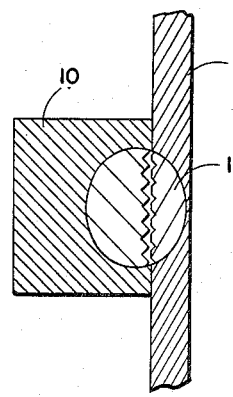
Fig. 5 is a section taken of lines 5—5 of Fig. 4 showing the adjacent portions of a reading head and the gauge beam.

Fig. 5 is a section taken on line 5—5 of Fig. 4 and illustrates the relative location of head 10 and gauge beam 2. The magnified circle 16 shows the relative construction of the teeth or grooves in the head and the grooves of the gauge beam. The gauge beam which is a rod of nonmagnetic material is manufactured having some magnetic material such as nickel or other material either on the teeth or in the slots. If the nickel is to be deposited on the teeth, the slots scribed by the ruling engine are first filled with a nonconducting material, such as a plastic. Following the lapping of the plastic, nickel is then electrodeposited on the lands, such as 17, Fig. 6. It may be that nickel could first be deposited on the surface of beam 2 and a ruling engine used to rule lines which penetrate the nickel. Another scheme of preparation would involve using a photographic reproduction of a standard grating and creating a mask through which nickel is electrodeposited. Excess nickel could be removed by grinding or lapping.

Figure 6:
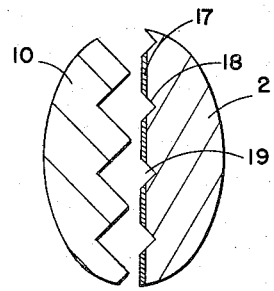
Fig. 6 is a sketch of the enlarged portion of Fig. 5 with the head and gauge beam in a different relative location.

Fig. 6 illustrates the relative location of head 10 in a position of minimum reluctance. Certain modifications are obvious in which nickel or other magnetic material is placed in the grooves instead of on the lands of the beam 2. Or, in another embodiment, the nickel may be plated on the head 10 and the teeth and grooves developed on the gauge beam.

It is contemplated that the lines or grooves illustrated in Fig. 6 are one five-hundredths of an inch apart or even less depending on the accuracy obtainable. When the head 10 moves with relation to gauge beam 2, the reluctance of the air gap between pole face 14 and pole face 15, Fig. 3, is increased or reduced depending on whether the teeth lie close to nickel or close to the nonmagnetic slots. As each reading head moves along the rods, then, its inductance fluctuates cyclically with position. If the head is spaced one ten-thousandths of an inch from the gauge rod as, for example, caused by the thickness of a film of lubricant, a two-to-one variation of the inductance of each reading head as it passes through a cycle is obtainable.

Referring to Fig. 2, it will be noticed that head 11 lies $N\lambda/2$ from head 10 (where $\lambda$ is the distance between successive lines and $N$ is any odd number). That is, when head 10 reaches the maximum inductance, head 11 reaches a minimum of inductance. Head 13 is similarly situated with respect to head 12. And head 12 lies $N\lambda/4$ (90°, or odd multiples thereof) from head 11. These two heads are connected in a bridge circuit illustrated in Fig. 7, in which the inductor coils 21 and 22 are fed in parallel from an oscillator 23 and provide a signal output of one phase or another through transformer 24 to phase-sensitive demodulating amplifier 25 which controls the state of flip-flop 26 to be either A or A'. Likewise, coils 27 and 28 are excited by oscillator 23 and provide an output through transformer 29 to phase-sensitive demodulating amplifier 30 controlling the state of flip-flop 31 to be either B or B'. Phase-sensitive demodulating amplifiers 25 and 30 are well-known in the art and details concerning their construction and operation may be found in the Massachusetts Institute of Technology Radiation Laboratory Series, vol. 19, Waveforms, page 512 et seq., Figs. 14.14, 14.15 and 14.19. Devices 25 and 30 would, of course, receive a reference, or carrier, frequency from oscillator 23. Logical circuit 32 receiving information from flip-flops 26 and 31 provides R output to right counter 8 and L output to left counter 9 in accordance with the progressive changes of states of the flip-flops. These outputs may be in the form of pulses.

Figure 7:
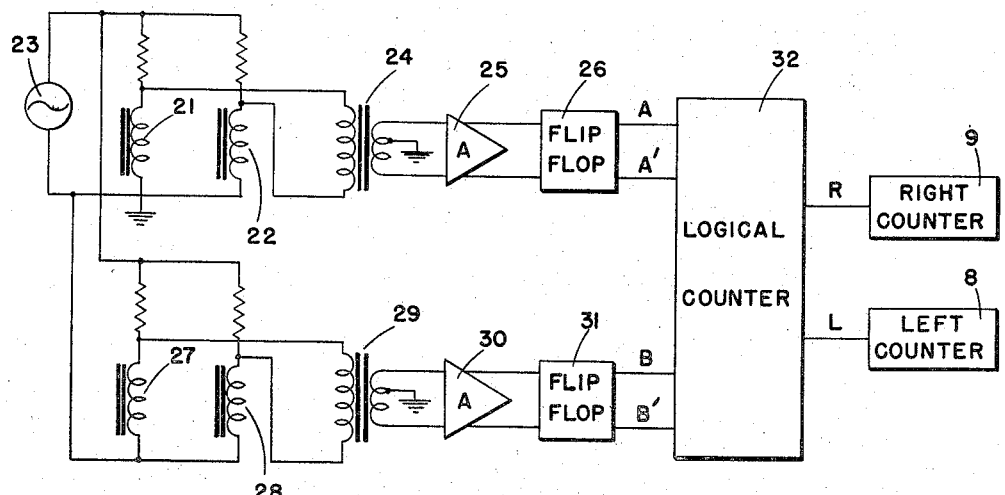
Fig. 7 is a diagram partially schematic and partially in block diagram illustrating the electrical connections of the heads to provide an output indicating motion and direction of motion.
Figure 8:
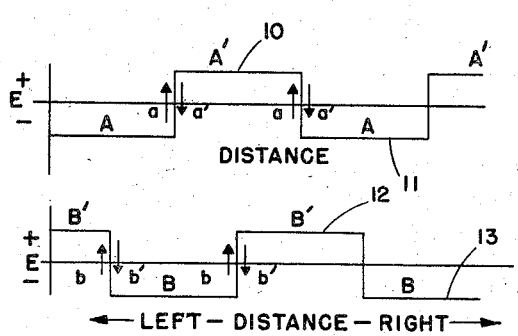
Fig. 8 is a square wave output of the flip-flops operated by the heads.

Referring to Fig. 8, the logical circuit which is responsive to each state and each change of state of the flip-flops of Fig. 7 is developed as follows: It can be seen that a square wave output provided by flip-flops controlled by two heads $N\lambda/4$ apart of four heads physically located as illustrated in Fig. 2 will provide the square wave output illustrated in Fig. 8. A maximum conduction by the head 10, for example, causes the flip-flop 25 to provide an output of A, and this is followed by a maximum conduction of head 11, which is indicated as A'. A maximum output of head 12 causes flip-flop 31 to provide output B which is followed by a maximum conduction of head 13 indicated as B'. In order to obtain the maximum use of information indicated by these two rectangular waves, the direction of motion is indicated as "$a$" while travelling towards A', and "$a'$" while traveling towards A. Further "$b$" indicates traveling towards B', and "$b'$" indicates traveling towards B. A logical equation can then be written indicating the motion to the right represented as R.

(1) $\qquad R=b'A+aB+bA'+a'B'$
(2) $\qquad L=aB'+b'A'+a'B+bA$ in which, for example, Equation (1) is interpreted literally as a right motion, R, is indicated if $b'$ exists and A exists, or $a$ and B exist, or $b$ and A' exist, or $a'$ and B' exist. If each line on the heads and the gauge beam lie one five-hundredths of an inch apart, the Equations (1) and (2) indicate a pulse can occur every one two-thousandths of an inch.

Figure 9:
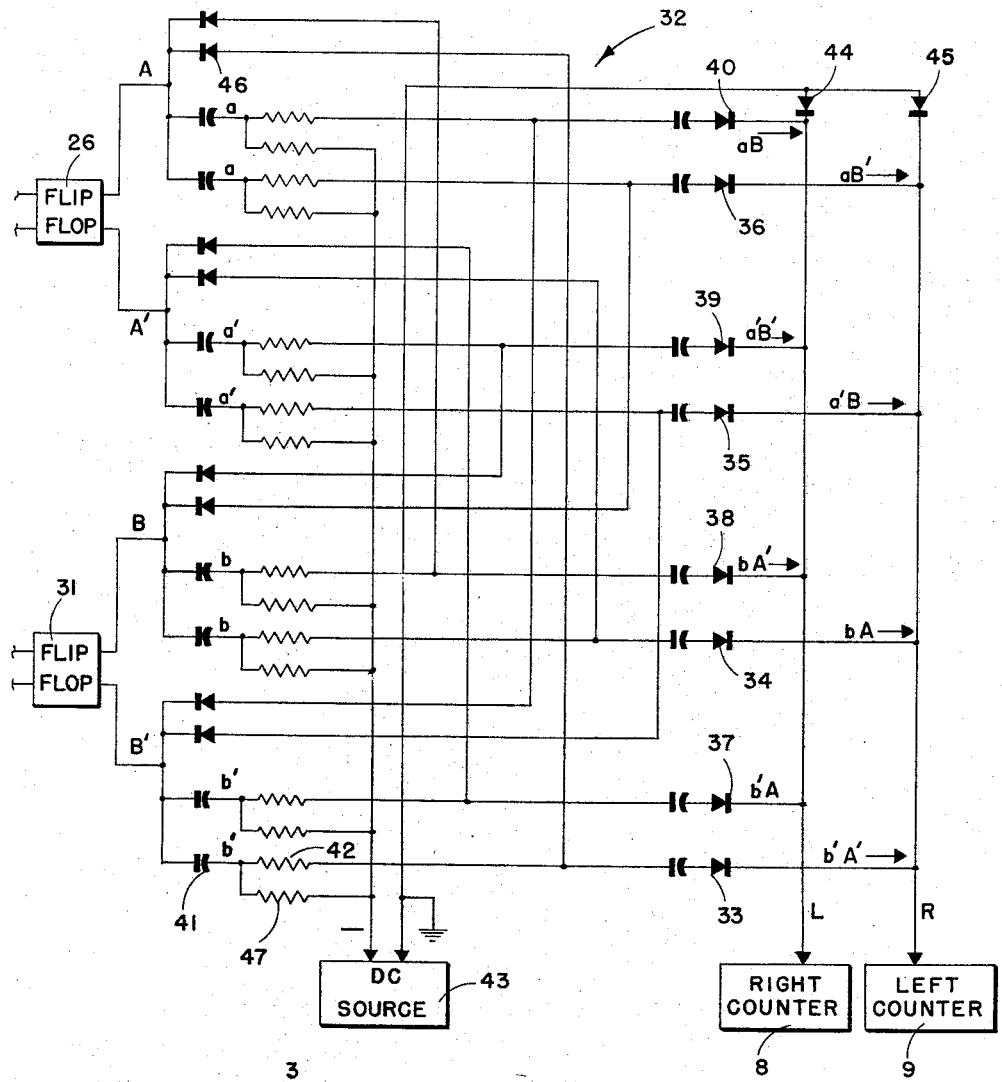
Fig. 9 is a schematic of the logical network of Fig. 7.

Fig. 9 illustrates obtaining the logic of Equations (1) and (2). Propositions A and A' are represented alternatively by the two states of flip-flop 26 and propositions B and B' are represented alternatively by the two states of flip-flop 31. It is noted from the graph of Fig. 8 that the propositions $a$, $a'$, $b$ and $b'$ are changes in state of the flip-flops and are obtained therefore by derivative circuits which detect changes. These derivative circuits are capacitor and resistor combinations such as 41 and 42.

It is assumed that the output of the flip-flop is 0 volts on one line and —3 on the other. The —3 volts represent a true condition, or the existence of the proposition. When, for example, flip-flop 31 changes state from B' to B (indicating the proposition previously described as $b'$), a positive pulse passes through capacitor 41 and resistor 42. The pulse can then proceed through diode 33 to left counter 9 unless the pulse is positive with respect to the voltage on the cathode of diode 46 (caused by flip-flop 26 being in the A state (—3 volts)). But if the flip-flop 26 is in the A' state, diode 46 is biased in the nonconducting direction and the pulse from resistor 42 passes into the left counter, indicating the coincidence of $b'$ and A'. Each of the other lines convey similar logic to the counters. Left counter 9 receives pulses through diode 33 if the proposition $b'$ and A' exists, or through diode 34 if the proposition $bA$ exists, or diode 35 if $a'B$ exists, or diode 36 if $aB'$ exists. Similarly, right counter 8 receives information through diodes 37, 38, 39 and 40.

D. C. source 43 holds the lines connected to the resistors such as 42 and 47 below ground. Thus, output pulses are possible only on lines whose control diodes such as 46 have cathodes at ground (i. e., 0 volts).

Diodes 44 and 45 allow positive pulses only to reach the right and left counters.

Figure 10:
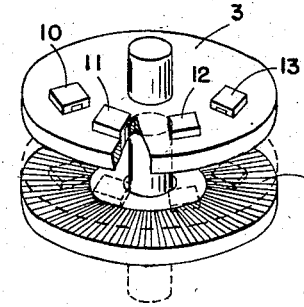
Fig. 10 is an illustration of the magnetic gauge utilized for measuring angles.

Fig. 10 is a sketch showing utilization of the device as an angle measuring device in which beam 2 takes a circular shape and heads 10, 11, 12 and 13 are disposed in circular fashion on assembly frame 3. Relative angular rotation causes changes in reluctance, and heads 10, 11, 12 and 13 provide signals indicating the relative motion similar to the explanation hereinbefore of Fig. 2. The dotted position of frame 3 shows the operative position.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A measuring device comprising a first element and a second element, said second element adapted to move along said first element, said second element comprising two pairs of inductors disposed in proximate relationship with respect to said first element, the proximate surface of one of said elements having numerous alternate lines of magnetic and nonmagnetic material located several hundred to the inch, the other of said elements having numerous successive lines of magnetic material located several hundred to the inch, said two pairs of said inductors being disposed in spaced relationship with respect to each other so that one pair of inductors have equal inductance when said other pair of inductors have differing inductance.

2. The combination recited in claim 1 wherein the proximate surface of said second element comprises the pole faces of two pairs of magnetic cores, said cores forming a part of said inductors, whereby the reluctance between the pole faces of each core is varied as said second element moves with respect to said first element, and wherein is included a plurality of flip-flop circuits responsive to the inductance of said inductors.

3. The combination recited in claim 1 wherein is included a plurality of flip-flop circuits responsive to the inductance of said inductors, and logical network means responsive to each state of said flip-flop circuits and each change of state of said flip-flop circuits, said logical network providing an electrical signal indicating the relative motion between said elements and the direction of motion.

4. The combination recited in claim 1 wherein is included a plurality of flip-flop circuits responsive to the inductance of said inductors, and logical network means responsive to said flip-flop circuits to provide information of the magnitude and direction of the relative motion between said elements.

5. A measuring device comprising a first element and a secondary element, said secondary element comprising four inductors, the first of said inductors disposed in a position of minimum inductance when the second of said inductors is disposed in a position of maximum inductance, the third of said inductors disposed in a position of maximum inductance when the fourth of said inductors is disposed in a position of minimum inductance, said first and second inductors being disposed in positions of unequal inductance when said third and fourth inductors are disposed in positions of equal inductance, said secondary element disposed in proximate relationship with said first element and adapted to move therealong in parallel relationship, the proximate surface of one of said elements having numerous alternate lines of material differing in permeability from the remaining lines, said first element comprising a magnetic material having numerous successive grooves therein, said grooves being equally spaced and parallel to said lines, and means for detecting changes in inductance of said inductors as said second element moves with respect to said first element.

6. A measuring device comprising a first element and a second element, said second element adapted to move along said first element, said second element comprising two pairs of inductors disposed in proximate relationship to said first element, the proximate surface of one of said elements having alternate lines of magnetic and non-magnetic material, the other of said elements having successive lines of magnetic material, said two pairs of said inductors being disposed in spaced relationship with respect to each other so that one pair of inductors have equal inductance when said other pair of inductors have differing inductance.

References Cited in the file of this patent
UNITED STATES PATENTS

| | | |
|---|---|---|
| 2,428,234 | Mapp | Sept. 30, 1947 |
| 2,609,143 | Stibitz | Sept. 2, 1952 |
| 2,656,106 | Stabler | Oct. 20, 1953 |